(12) United States Patent
Nishiyama

(10) Patent No.: US 8,134,270 B2
(45) Date of Patent: Mar. 13, 2012

(54) SYNCHRONOUS MOTOR

(75) Inventor: Noriyoshi Nishiyama, Osaka (JP)

(73) Assignee: Panasonic Corporation, Osaka (JP)

( * ) Notice: Subject to any disclaimer, the term of this patent is extended or adjusted under 35 U.S.C. 154(b) by 152 days.

(21) Appl. No.: 12/808,027

(22) PCT Filed: Oct. 26, 2009

(86) PCT No.: PCT/JP2009/005637
§ 371 (c)(1),
(2), (4) Date: Jun. 14, 2010

(87) PCT Pub. No.: WO2010/050172
PCT Pub. Date: May 6, 2010

(65) Prior Publication Data
US 2010/0289373 A1 Nov. 18, 2010

(30) Foreign Application Priority Data
Oct. 28, 2008 (JP) .................. 2008-276679

(51) Int. Cl.
*H02K 3/00* (2006.01)
*H02K 21/12* (2006.01)
(52) U.S. Cl. ........ 310/184; 310/179; 310/180; 310/195; 310/198; 310/208; 310/156.45
(58) Field of Classification Search ............. 310/156.45, 310/154.22, 195, 198, 184, 179, 180, 208; H02K 3/00
See application file for complete search history.

(56) References Cited

U.S. PATENT DOCUMENTS

| | | | | |
|---|---|---|---|---|
| 1,545,175 | A * | 7/1925 | Turbayne ...................... 323/203 |
| 5,233,253 | A * | 8/1993 | Nishio et al. .................. 310/184 |
| 5,834,866 | A * | 11/1998 | Fujitani et al. ............. 310/49.33 |
| 6,034,460 | A | 3/2000 | Tajima et al. |
| 6,285,104 | B1 | 9/2001 | Nashiki |
| 6,396,183 | B1 | 5/2002 | Tajima et al. |
| 6,734,592 | B2 | 5/2004 | Tajima et al. |
| 6,949,856 | B2 | 9/2005 | Tajima et al. |
| 7,196,447 | B2 | 3/2007 | Tajima et al. |
| 7,215,055 | B2 | 5/2007 | Tajima et al. |
| 7,288,868 | B2 * | 10/2007 | Tamaki et al. ............. 310/254.1 |
| 7,417,349 | B2 | 8/2008 | Tajima et al. |
| 7,671,502 | B2 | 3/2010 | Tajima et al. |
| 2002/0047430 | A1 | 4/2002 | Iwasaki et al. |
| 2002/0130576 | A1 | 9/2002 | Tajima et al. |
| 2007/0194650 | A1 * | 8/2007 | Ito et al. ........................ 310/179 |
| 2009/0309449 | A1 | 12/2009 | Tajima et al. |

FOREIGN PATENT DOCUMENTS

| | | |
|---|---|---|
| JP | 9-163710 | 6/1997 |
| JP | 9-285088 | 10/1997 |
| JP | 11-318062 | 11/1999 |
| JP | 2000-41392 | 2/2000 |
| JP | 2001-186736 | 7/2001 |
| JP | 2002-10597 | 1/2002 |
| JP | 2003-244915 | 8/2003 |
| JP | 2005-124356 | 5/2005 |
| JP | 2006-288043 | 10/2006 |

* cited by examiner

Primary Examiner — Quyen Leung
Assistant Examiner — Thomas Truong

(57) ABSTRACT

Provided is a synchronous motor comprising a rotor that includes magnetic poles arranged at equal intervals in the circumferential direction, and a stator that includes stator teeth arranged at intervals in the circumferential direction. Stator teeth other than a reference tooth are displaced from positions corresponding to integral multiples of the phase difference of two-phase alternating currents with respect the stator tooth in electrical angle. Both a first-type coil supplied with a first phase and a second-type coil supplied with a second phase are wound by concentrated winding on the stator teeth arranged at the displaced positions.

15 Claims, 10 Drawing Sheets

➡ Winding directions of first-type coils C1-C18

⇨ Winding directions of second-type coils D1-D18

D = π/9 radians

E = $\pi/2$ radians

➡ Winding directions of first-type coils
⇨ Winding directions of second-type coils ➡ Winding directions of first-type coils C1-C18A ⇨ Winding directions of second-type coils D1-D18A D=π/9 radians
F=π/18 radians

SYNCHRONOUS MOTOR

TECHNICAL FIELD

The present invention relates to a winding structure of a synchronous motor that is driven by a two-phase AC, and in particular, to a technology to improve torque characteristics.

BACKGROUND ART

Conventionally, two-phase motors driven by a two-phase AC is used in various devices.

Patent Literature 1 discloses a two-phase motor in which 18 rotor magnets are arranged with equal intervals in the circumferential direction, and 12 stator salient poles are also arranged with equal intervals in the circumferential direction. According to this structure, each interval between two adjacent stator salient poles is $3\pi/2$ radians in electrical angle. A coil is wound on each stator salient pole by concentrated winding, and assuming that the stator salient poles are assigned A1, B1, A2, B2, ..., A6, and B6 in the sequential order of the alignment in the circumferential direction, the coils belonging to A group (A1, A2, ..., A6) are connected to form an A-phase winding, and the coils belonging to B group (B1, B2, ..., B6) are connected to form a B-phase winding. As a whole, the windings of the stator salient poles have a two-phase winding structure. The two-phase windings are supplied with two-phase alternating currents.

The two-phase windings applied with the two-phase alternating currents are excited to generate a revolving field in the air gap. In synchronism with this rotating field, the rotor magnet receives an attracting (repulsive) force, so that it continues to rotate at a constant synchronous rotation speed.

CITATION LIST

[Patent Literature]
[Patent Literature 1]
Japanese Laid-Open Patent Application Publication No. H9-163710

SUMMARY OF INVENTION

[Technical Problem]

Synchronous motors for use in compressors, electric vehicles, hybrid vehicles, fuel-cell vehicles, and the like particularly require high torque and small torque pulsation due to necessity for characteristics such as the following: compact size, light weight, high output, low vibration, low noise, and high efficiency.

However, the conventional two-phase motor has large torque pulsation as described below and is in need of a further improvement.

In the conventional two-phase motor, only the A-phase winding is wound on the six stator salient poles (corresponding to stator teeth) belonging to the A group. Accordingly, the six stator salient poles belonging to the A group generate the maximum torque simultaneously at a cycle equivalent to $\pi$ radians. Similarly, the six stator salient poles belonging to the B-group generate the maximum torque simultaneously at a cycle which is equivalent to $\pi$ radians and is out of phase with that of the A group by $\pi/2$ radians. In other words, the torque peak occurs four times in $2\pi$ radians corresponding to one cycle of the two-phase alternating currents. Since the magnitude of the peak is a combined torque of the six stator salient poles, the torque pulsation is large.

In view of the above problem, the present invention aims to provide a technology to reduce the torque pulsation of a synchronous motor driven by a two-phase alternating current, with respect to conventional cases.

[Solution to Problem]

In order to achieve the stated aim, one aspect of the present invention is a synchronous motor driven by a two-phase alternating current composed of a first-phase alternating current and a second-phase alternating current which have a phase difference with respect to each other, the synchronous motor comprising: a rotor that includes a plurality of magnetic poles arranged at equal intervals in a circumferential direction; and a stator that includes an annular yoke and N teeth arranged at intervals on the yoke in the circumferential direction, N being an integer of four or greater, wherein the stator is configured such that the N teeth (i) include sets of n teeth, n teeth in each set being disposed at a same position in terms of electrical angle, and (ii) are grouped into first groups of k teeth, k teeth in each first group being aligned in the circumferential direction, each first group being rotationally symmetric about an axis of the yoke, n and k each being an integer of two or greater, and N=k·n, one of the k teeth in each first group is a reference tooth, and at least another one of the k teeth in the first group is a displaced tooth which is displaced from a position corresponding to an integral multiple of the phase difference with respect to the reference tooth in electrical angle, only either one of first-type coils or one of second-type coils is wound on the reference tooth by concentrated winding, the first-type coils being supplied with the first-phase alternating current, and the second-type coils being supplied with the second-phase alternating current, both one of the first-type coils and one of the second-type coils are each wound on the displaced tooth by concentrated winding, first-type coils wound on the teeth in each first group are connected in series, and second-type coils wound on k teeth, aligned in the circumferential direction, in each of second groups are connected in series, the second groups being either same or different with respect to the first groups.

[Advantageous Effects of Invention]

According to the stated structure, at least one tooth (stator tooth) is a displaced tooth which is displaced from a position corresponding to an integral multiple of the phase difference with respect to the reference tooth. Both a first-type coil and a second-type coil are wound on the displaced tooth. Consequently, the displaced tooth and the reference tooth generate the maximum torque at different timings. Consequently, the number of torque peaks in one cycle of the two-phase alternating current increases, which leads to variance in generation timings of the peaks. At the same time, the magnitude of the peaks is reduced. As a result, the torque pulsation can be reduced compared to conventional cases.

DESCRIPTION OF EMBODIMENTS

The following describes preferred embodiments of the present invention in detail with reference to the drawings.

First Embodiment

<General Structure>

Figure 1:
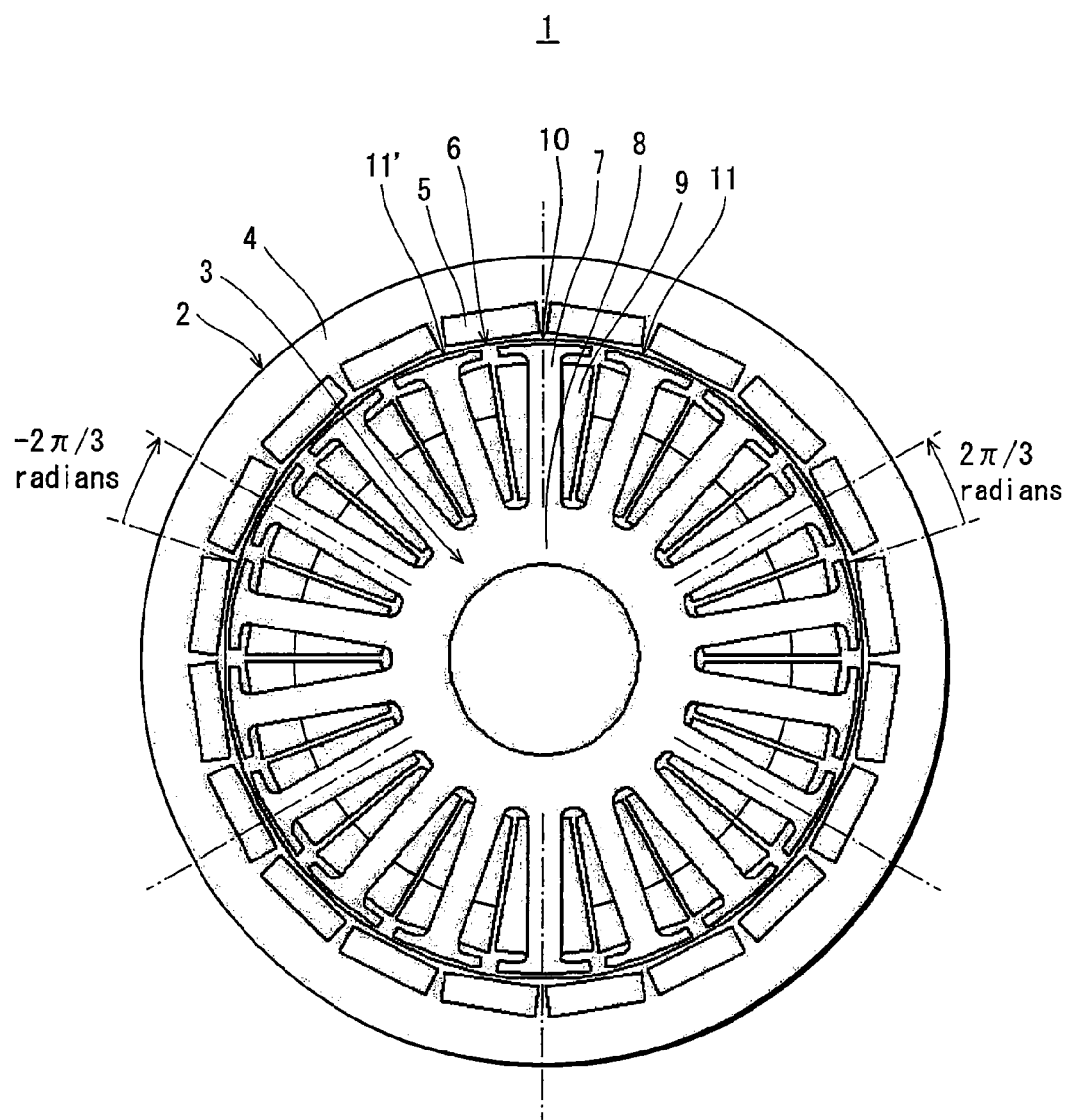
FIG. 1 is a plan view showing a synchronous motor pertaining to a first embodiment of the present invention.

FIG. 1 is a plan view showing a synchronous motor pertaining to a first embodiment of the present invention.

A synchronous motor 1 includes a rotor 2 and a stator 3.

The rotor 2 includes a stator core 4 and 20 permanent magnets 5. The permanent magnets 5 are arranged inside the rotor core 4 at equal angular intervals in the circumferential direction of the rotor 2. Magnetic poles 6 formed by the permanent magnets 5 constitute magnetic pole pairs in which N-poles and S-poles are alternately arranged with respect to the stator 3. Each magnetic pole pair of an N-pole and an S-pole corresponds to $2\pi$ radians in electrical angle, and two adjacent magnetic poles are arranged at an interval of $\pi$ radians in electrical angle. In the present embodiment, the rotor 2 has 20 magnetic poles, and the electrical angle of the rotor 2 is 10 times the mechanical angle thereof.

The stator 3 includes a stator yoke 8 in an annular shape and N stator teeth 7 arranged on the stator yoke 8 at intervals in the circumferential direction of the stator yoke 8. N is an integer of four or greater, and in the present embodiment, N=18. The stator teeth 7 are arranged at equal angular intervals in the circumferential direction of the stator yoke 8. Because there are 20 magnetic poles and 18 stator teeth, the stator teeth 7 are arranged along the circumference with a displacement of 10/9 per semicircle, and two adjacent stator teeth 7 are arranged at an interval of $(n+\pi/9)$ radians in electrical angle. A coil 9 is wound on each stator tooth 7.

Pole-to-pole gaps 10 and 11 each indicate a position of a magnetic neutral point between an N-pole and an S-pole formed by the permanent magnets 5 arranged on the rotor 2. In this case, the pole-to-pole gaps 10 and 11 each also indicate a mechanical position between two magnets. When seen in the counterclockwise direction, an N-pole changes over to an S-pole at the pole-to-pole gap 10 and an S-pole changes over to the N-pole at the pole-to-pole gap 11. Note that 11' is spaced from the pole-to-pole gap 11 by $2\pi$ radians in electrical angle. The position of the pole-to-pole gap indicated by 11' is the same as that of the pole-to-pole gap 11 in terms of electrical angle due to repetition of magnetic pole pairs, but is different from that of the pole-to-pole gap 11 in terms of mechanical angle.

<Positional Relationship of Stator Teeth and Structure of Stator Windings>

Figure 2:
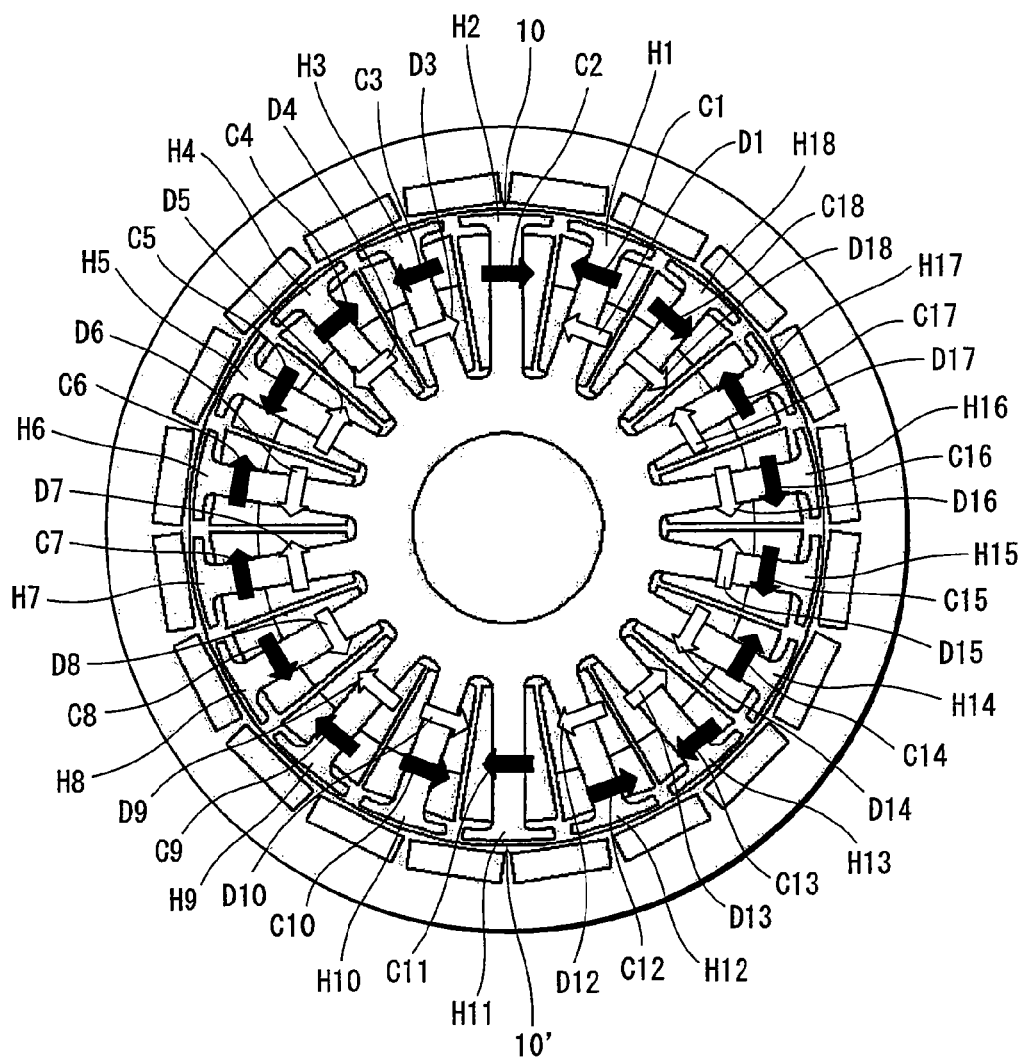
FIG. 2 is a plan view schematically showing types and winding directions of coils in the synchronous motor of FIG. 1.
Figure 3:
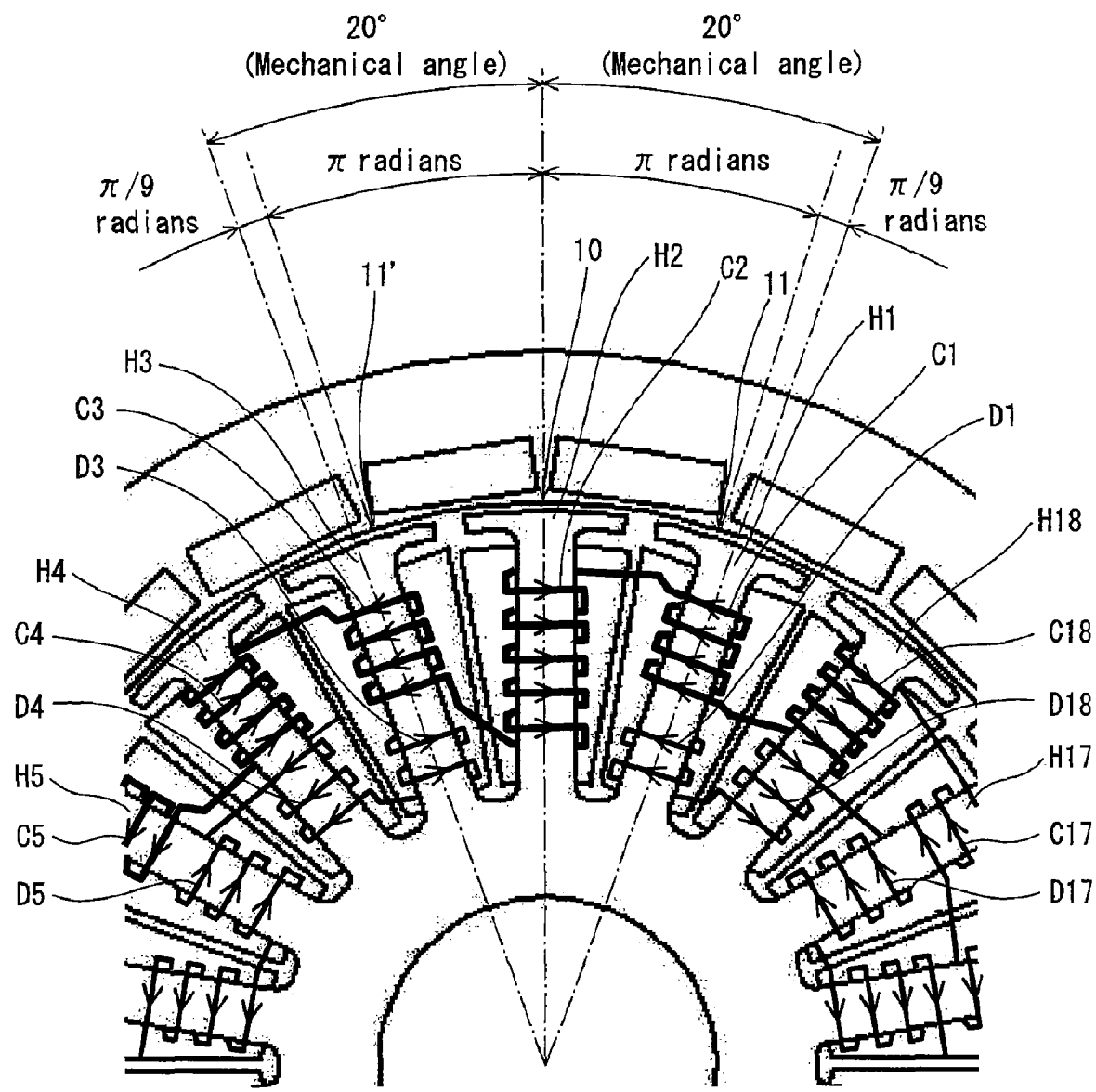
FIG. 3 is a detail view of the synchronous motor of FIG. 1.
Figure 4:
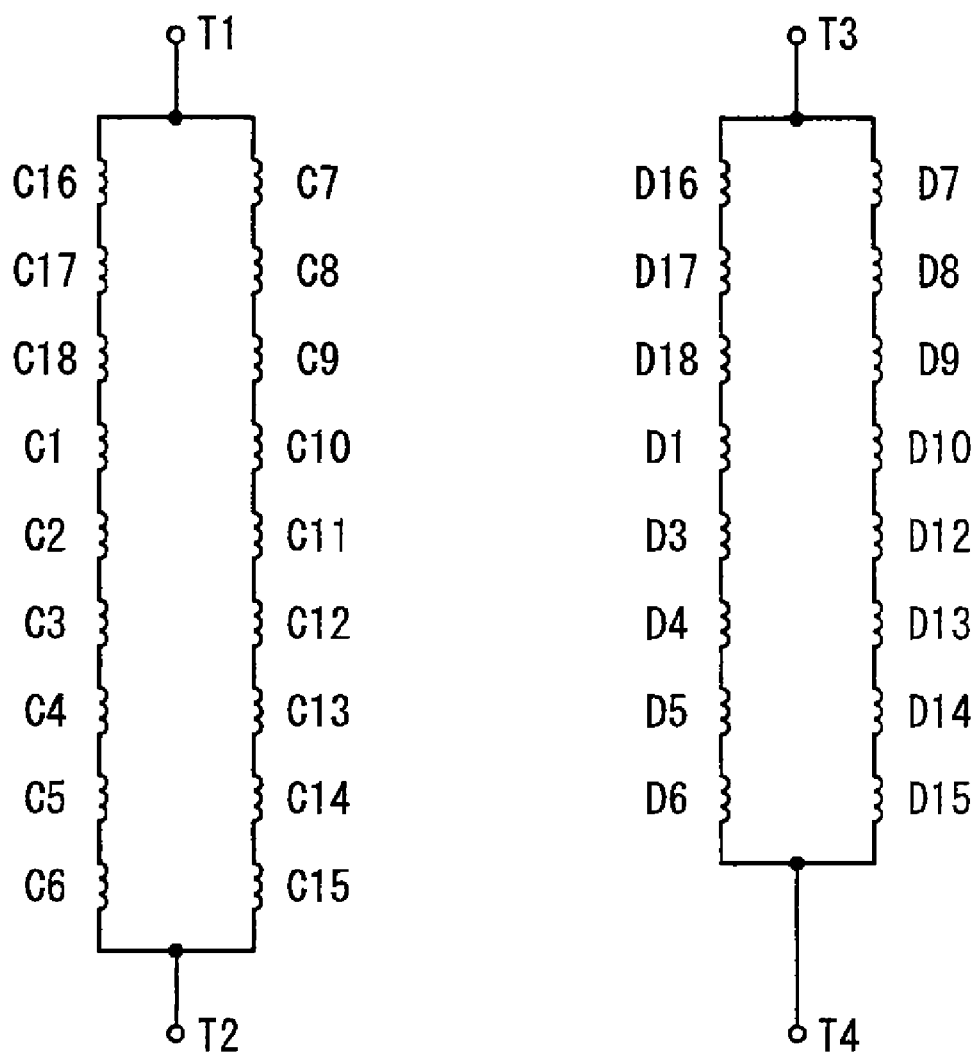
FIG. 4 shows a connection relationship of the coils in the synchronous motor of FIG. 1.
Figure 5:
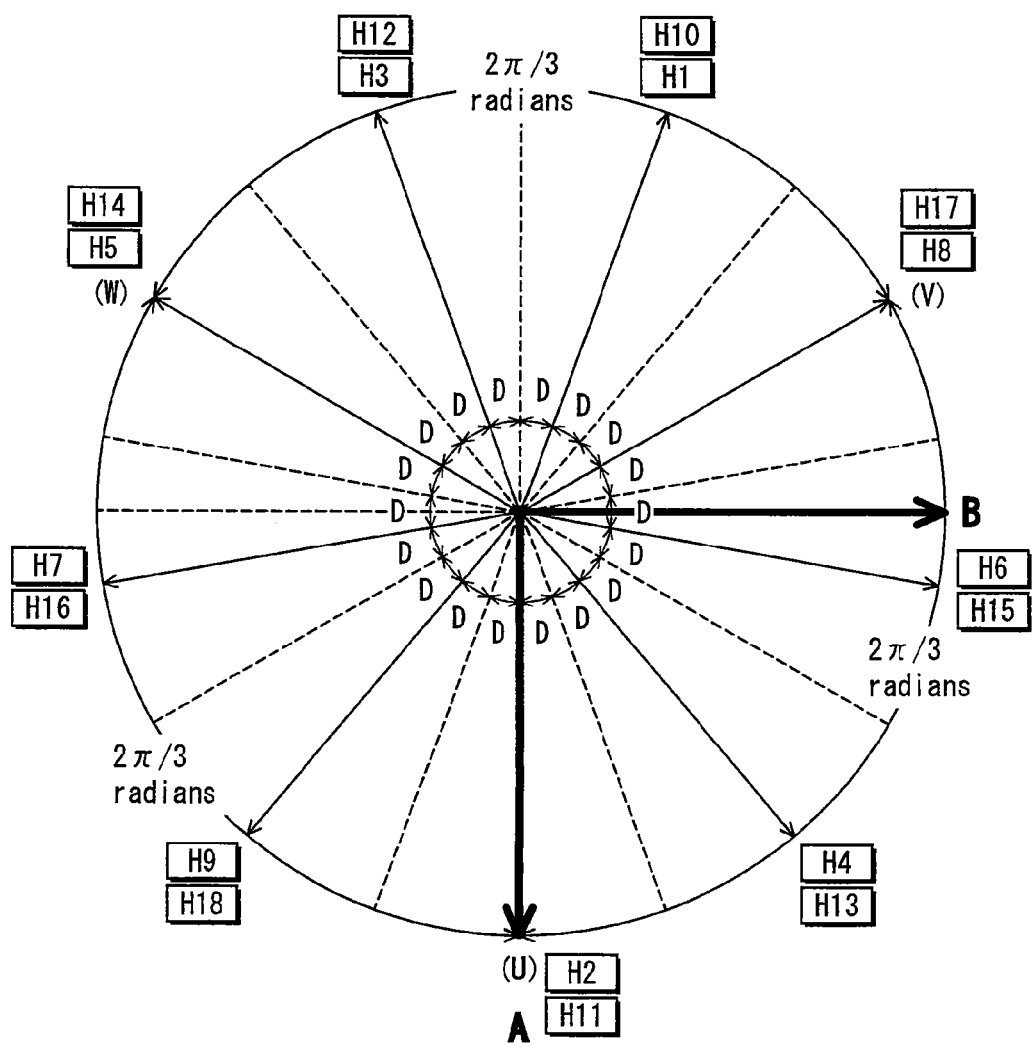
FIG. 5 is a vector diagram showing magnitudes and phases of magnetic fields generated by stator teeth of the synchronous motor of FIG. 1.

FIG. 2 is a plan view schematically showing types and winding directions of the coils in the synchronous motor of FIG. 1; FIG. 3 is a detail view of the synchronous motor of FIG. 1; FIG. 4 shows a connection relationship of the coils in the synchronous motor of FIG. 1; and FIG. 5 is a vector diagram showing magnitudes and phases of magnetic fields generated by the stator teeth of the synchronous motor of FIG. 1.

First, the positional relationship of the stator teeth is described.

The 18 stator teeth 7 are assigned reference signs from H1 to H18, respectively. When the position of the stator tooth H2 is assumed to correspond to the position of 0 radian in electrical angle, the positions of the following stator teeth are as follows: the stator tooth H3 is positioned at $(n+\pi/9)$ radians, i.e. $10\pi/9$ radians, in electrical angle; the stator tooth H4 is positioned at $(2\pi+2\pi/9)$ radians, i.e. $2\pi/9$ radians, in electrical angle; and the stator tooth H5 is positioned at $(3\pi+3\pi/9)$ radians, i.e. $12\pi/9$ radians, in electrical angle. Table 1 below shows the positions of the stator teeth with reference to the stator tooth H2.

| H1 | H2 | H3 | H4 | H5 | H6 | H7 | H8 | H9 |
|---|---|---|---|---|---|---|---|---|
| $\frac{8}{9}\pi$ | 0 | $\frac{10}{9}\pi$ | $\frac{2}{9}\pi$ | $\frac{12}{9}\pi$ | $\frac{4}{9}\pi$ | $\frac{14}{9}\pi$ | $\frac{6}{9}\pi$ | $\frac{16}{9}\pi$ |
| H10 | H11 | H12 | H13 | H14 | H15 | H16 | H17 | H18 |
| $\frac{8}{9}\pi$ | 0 | $\frac{10}{9}\pi$ | $\frac{2}{9}\pi$ | $\frac{12}{9}\pi$ | $\frac{4}{9}\pi$ | $\frac{14}{9}\pi$ | $\frac{6}{9}\pi$ | $\frac{16}{9}\pi$ |

The stator teeth H1 to H18 include sets of stator teeth, each set being composed of n stator teeth disposed at the same position in terms of electrical angle. n is an integer of two or greater, and in the present embodiment, there are sets of two stator teeth arranged at the same position in terms of electrical angle, as shown in Table 1. For example, the stator teeth H2 and H11 both are disposed at the same position in terms of electrical angle. This is apparent also from FIG. 2 showing that the central axis of the stator tooth H11 coincides with a pole-to-pole gap 10' when the central axis of the stator tooth H2 coincides with the pole-to-pole gap 10.

Furthermore, in the positional relationship of the stator teeth H1 to H18, each group of k stator teeth aligned in the circumferential direction is rotationally symmetric about an axis of the stator yoke. k is an integer of two or greater, and in the present embodiment, k=9. For example, FIG. 2 shows that, in the counterclockwise direction, a group of 9 stator teeth from H16 to HE and a group of 9 stator teeth from H7 to H15 are rotationally symmetric about the axis.

In other words, the number N of the stator teeth 7 included in the stator 3 is obtained as follows: N=k·n. In the present embodiment, since n=2 and k=9, N=18.

Next, the structure of the stator windings is explained. On each stator tooth, one or both of a first-type coil and a second-type coil are concentrically wound, i.e. wound by concentrated winding. Each first-type coil is supplied with an A-phase current of the two-phase alternating current, and each second-type coil is supplied with a B-phase current of the two-phase alternating current, the B-phase current being delayed from the A-phase current by $\pi/2$ radians. In FIG. 2, black arrows schematically show directions of the current fed to the first-type coils when seen from a stator end surface. Similarly, white arrows schematically show directions of the current fed to the second-type coils when seen from the stator end surface.

First, description is given on the structure of the windings of the stator teeth H2, H17, and H5 which hold a positional relationship with intervals of $2\pi/3$ radians in electrical angle (corresponding to a U-phase, a V-phase, and a W-phase of conventional three-phase motors).

On the stator tooth H2, only $N_0$ turns of a first-type coil C2 are wound (see the black arrow and FIG. 3). With this structure, the phase of the magnetic field generated by the stator tooth H2 is the same as the phase of the A-phase current (see FIG. 5, H2).

In the present embodiment, under the assumption that $A_n$ turns of a first-type coil and $B_n$ turns of a second-type coil are wound on a stator tooth positioned with an interval of θn radians in electrical angle with respect to the position of the stator tooth H2, the numbers of turns $A_n$ and $B_n$ satisfy the following expressions.

$$A_n \approx N_0 \times \cos(\theta n)$$

$$B_n \approx N_0 \times \sin(\theta n)$$

The stator tooth H17 leads the stator tooth H2 by $2\pi/3$ radians in electrical angle. Based on the expressions above, a number of turns A17 of the first-type coil C17 and a number of turns B17 of a second-type coil D17 that are wound on the stator tooth H17 are determined as follows.

$$A17 \approx N_0 \times \cos(2\pi/3) = N_0 \times (-0.50)$$

$$B17 \approx N_0 \times \sin(2\pi/3) = N_0 \times 0.87$$

Here, the value of the number of turns A17 being negative indicates that when the current is applied, the first-type coil C17 wound on the stator tooth H17 generates a magnetic field having a direction opposite to that of the magnetic field generated by the first-type coil C2 wound on the stator tooth H2. In the present embodiment, winding directions are reversed to generate magnetic fields of opposite directions which are indicated by opposite arrows as shown in FIG. 2. Note that the following structure can be adopted alternatively: the coils C17 and C2 are wound in the same direction; the coil C17 is connected in a manner that the current is fed from the winding leading terminal toward the winding trailing terminal; and the coil C2 is connected in a manner that the current is fed from the winding trailing terminal toward the winding leading terminal.

In the expressions above, a sign ($\approx$) indicating that the right side and the left side are substantially equal is used. This is because both sides hardly match each other in reality. Note that the above-mentioned sign includes a degree of match where when the right side is a decimal number, an integer close to the decimal number is adopted, and also includes a degree of match which includes a difference that can be ignored as a design error.

The magnetic field generated by the stator tooth H17 is a combined magnetic field of the magnetic field generated by the A-phase current and the magnetic field generated by the B-phase current, and the phase thereof is delayed by $2\pi/3$ radians with respect to the phase of the magnetic field generated by the stator tooth H2 (see FIG. 5, H17).

On the other hand, the stator tooth H5 is delayed from the stator tooth H2 by $2\pi/3$ radians in electrical angle. Based on the expressions above, a number of turns A5 of a first-type coil C5 and a number of turns B5 of a second-type coil D5 that are wound on the stator toothH5 are determined as follows.

$$A5 \approx N10 \times \cos(-2\pi/3) = N_0 \times (-0.50)$$

$$B5 \approx N10 \times \sin(-2\pi/3) = N_0 \times (-0.87)$$

The magnetic field generated by the stator tooth H5 is a combined magnetic field of the magnetic field generated by the A-phase current and the magnetic field generated by the B-phase current, and the phase thereof is advanced by $2\pi/3$ radians with respect to the phase of the magnetic field generated by the stator tooth H2 (see FIG. 5, H5).

As apparent from the above, by applying a two-phase alternating current having a phase difference of $\pi/2$ radians to the first-type coils and the second-type coils, magnetic fields equivalent to those generated when three-phase currents having phase differences of $2\pi/3$ radians are applied are generated by the stator teeth H2, H17, and H5.

In the following, description is given in a similar manner on the structure of the windings of the stator teeth H1 and H3, which are adjacent to the stator tooth H2, and magnetic fields generated by these stator teeth.

As shown in FIG. 3, when assuming that the counterclockwise direction is a plus direction, the stator tooth H1 is delayed by $\pi/9$ radians in electrical angle from a position that is displaced from the stator tooth H2 by n radians, and the stator tooth H3 leads, by $\pi/9$ radians in electrical angle, a position that is displaced from the stator tooth H2 by π radians.

On the stator tooth H1 which is adjacent to the stator tooth H2, A1 turns of a first-type coil C1($A1 \approx N_0 \times \cos(-\pi-\pi/9) = N_0 \times \cos(-0.94)$) and B1 turns of a second-type coil D1 ($B1 \approx NO \times \sin(-\pi-\pi/9) = NO \times 0.34$) are wound. The number of turns A1 of the first-type coil C1 being a negative value indicates that the first-type coil C1 is wound in a direction opposite to that of the first-type coil C2 wound on the stator tooth H2. The magnetic field generated by the stator tooth H1 is a combined magnetic field of the magnetic field generated by the A-phase current and the magnetic field generated by the B-phase current, and the phase thereof leads −A phase which is a reverse of the A-phase, by $\pi/9$ radians (see FIG. 5, H1).

On the stator tooth H3 adjacent to the stator tooth H2, A3 turns of a first-type coil C3 ($A3 \approx N_0 \times \cos(\pi+\pi/9) = N_0 \times \cos(-0.94)$) and B3 turns of a second-type coil D3 ($B3 \approx N10 \times \sin(\pi+\pi/9) = N_0 \times (-0.34)$) are wound. The number of turns of the first-type coil C3 being a negative value indicates that the first-type coil C3 is wound in a direction opposite to that of the first-type coil C2 wound on the stator tooth H2. The magnetic field generated by the stator tooth H3 is a combined magnetic field of the magnetic field generated by the A-phase current and the magnetic field generated by the B-phase current, and the phase thereof is delayed from −A phase which is the reverse of the A-phase, by $\pi/9$ radians (see FIG. 5, H3).

As described above, in the present embodiment, the stator windings of each phase have the above-mentioned structure. Accordingly, when currents having different phases are supplied to the coils wound on one stator tooth, the magnetic field generated by the stator tooth is a vector synthesis of magnetic fields generated based on the coils.

Table 2 below shows a ratio of turns of the first-type and second-type coils wound on each stator tooth under assumption that the number of turns of the first-type coil C2 wound on the stator tooth H2 is 1.00.

TABLE 2

| | H1 H10 | H2 H11 | H3 H12 | H4 H13 | H5 H14 | H6 H15 | H7 H16 | H8 H17 | H9 H18 |
|---|---|---|---|---|---|---|---|---|---|
| A | −0.94 | 1.00 | −0.94 | 0.77 | −0.50 | 0.17 | 0.17 | −0.50 | 0.77 |
| B | 0.34 | 0.00 | −0.34 | 0.64 | −0.87 | 0.98 | −0.98 | 0.87 | −0.64 |
| Σ | 1.28 | 1.00 | 1.28 | 1.41 | 1.37 | 1.16 | 1.16 | 1.37 | 1.41 |

A indicates a ratio of the number of turns of the first-type coils; B indicates a ratio of the number of turns of the second-type coils; and E indicates the total of A and B. Note that the ratios are expressed using± to indicate the winding directions of the coils.

The ratio A of the number of turns of the first-type coil wound on the stator tooth H2 (H11) is 1.00. Since the stator teeth H2 and H11 have the same position in terms of electrical angle, the windings thereof have the same structure.

The ratio A of the number of turns of the first-type coil wound on the stator tooth H3 (H12) is −0.94. This indicates that the direction of the magnetic field when a current is applied is opposite to that of the stator tooth H2 (H11), and also indicates that the ratio of the number of turns is 0.94. The ratio B of the number of turns of the second-type coil is −0.34. This indicates that the direction of the magnetic field generated when a current is fed in the same direction as the current fed to A is opposite to the direction of the magnetic field generated by the current fed to A, and also indicates that the ratio of the number of turns is 0.34. The ratio of the total number of turns of the stator tooth H3 (H12) is equivalent to 1.28.

The ratio of the total number of turns of the stator tooth H4 (H13) is 1.41, which is the greatest among the stator teeth H1 to H18. The ratio of the total number of turns varies in a range of 1.00 to 1.41.

The connection relationship of the coils wound on the stator teeth are as shown in FIG. 4.

For each group of nine stator teeth aligned in the circumferential direction, first-type coils are connected in series. Specifically, the first-type coils C16 to C6 which are respectively wound on nine stator teeth H16 to H6 aligned in the counterclockwise direction are connected in series; and the first-type coils C7 to C15 which are respectively wound on nine stator teeth H7 to H15 aligned in the counterclockwise direction are connected in series. These two groups are connected in parallel and connected to external terminals T1 and T2.

Furthermore, for the same group of stator teeth, second-type coils are connected in series. Specifically, the second-type coils D16 to D6 respectively wound on the nine stator teeth H16 to H6 are connected in series; and the second-type coils D7 to D15 respectively wound on the nine stator teeth H7 to H15 are connected in series. These two groups of coils are connected in parallel and connected to external terminals T3 and T4.

With the above-described structure, the following effects can be achieved.

The stator teeth are arranged at equal angular intervals of $(\pi+\pi/9)$ radians in electrical angle, and the number of turns of the first-type coils and the second-type coils wound on the stator teeth are set such that the phases of the magnetic fields generated by the stator teeth are displaced by $(\pi+\pi/9)$ radians. Consequently, the overall torque can be increased because each stator tooth is able to generate the maximum torque at optimal timing. Furthermore, torque pulsation can be reduced with respect to that of the conventional structures, since the timings at which the stator teeth generate the maximum torque are distributed.

For example, as shown in FIG. 3, in electrical angle, the position of the stator tooth H1 is delayed by $\pi/9$ radians from the position that is displaced from the stator tooth H2 by $\pi$ radians. At the stator tooth H1 having the above-described positional relationship, a magnetic field H1 is generated. As shown in FIG. 5, the phase of the magnetic field H1 leads the phase which is a reverse of a magnetic field H2 (the phase is displaced from the magnetic field H2 by $\pi$ radians) only by $\pi/9$ radians. Accordingly, the maximum magnetic field is generated at the stator tooth H1 when the axis of the stator tooth H1 coincides with the pole-to-pole gap 11 of the rotor, and the maximum magnetic field is generated at the stator tooth H2 when the axis of the stator tooth H2 coincides with the pole-to-pole gap 10 of the rotor.

Meanwhile, as shown in FIG. 3, in electrical angle, the position of the stator tooth H3 is advanced by $\pi/9$ radians with respect to the position that is displaced from the stator tooth H2 by $\pi$ radians. At the stator tooth H3 having the above-described positional relationship, a magnetic field H3 is generated. As shown in FIG. 5, the phase of the magnetic field H3 is delayed from the phase which is the reverse of the magnetic field H2 (the phase is displaced from the magnetic field H2 by $\pi$ radians) only by $\pi/9$ radians. Accordingly, the maximum magnetic field is generated at the stator tooth H2 when the axis of the stator tooth H2 coincides with the pole-to-pole gap 10 of the rotor, and the maximum magnetic field is generated at the stator tooth H3 when the axis of the stator tooth H3 coincides with the pole-to-pole gap 11' of the rotor.

As described above, the numbers of turns of the first-type and second-type coils wound on the stator teeth are set so as to cancel positional displacements with respect to the reference stator tooth in terms of electrical angle. Accordingly, coincidence of the axis of a stator tooth and a pole-to-pole gap of the rotor enables the maximum field to be generated at the stator tooth, maximizing the magnetic torque generated by each stator tooth. As a result, the overall torque can be improved. Also, because the torques generated by the stator teeth become substantially constant, the torque pulsation can be reduced.

According to the structure of the present invention, at least one stator tooth has only one of the first-type and second-type coils wound thereon. Such a structure can attain the following advantages.

Firstly, because the phase of the applied current can be efficiently used, the coils achieve a high space factor ratio, thereby facilitating reduction in size. Secondly, interphase insulation is not required for the stator teeth having only one type of coil wound thereon, which results in higher reliability. Thirdly, since a space for accommodating insulating materials used for interphase insulation is not required, the space can also be utilized for winding, which leads to downsizing.

<Comparison of Torque>

Figure 6:
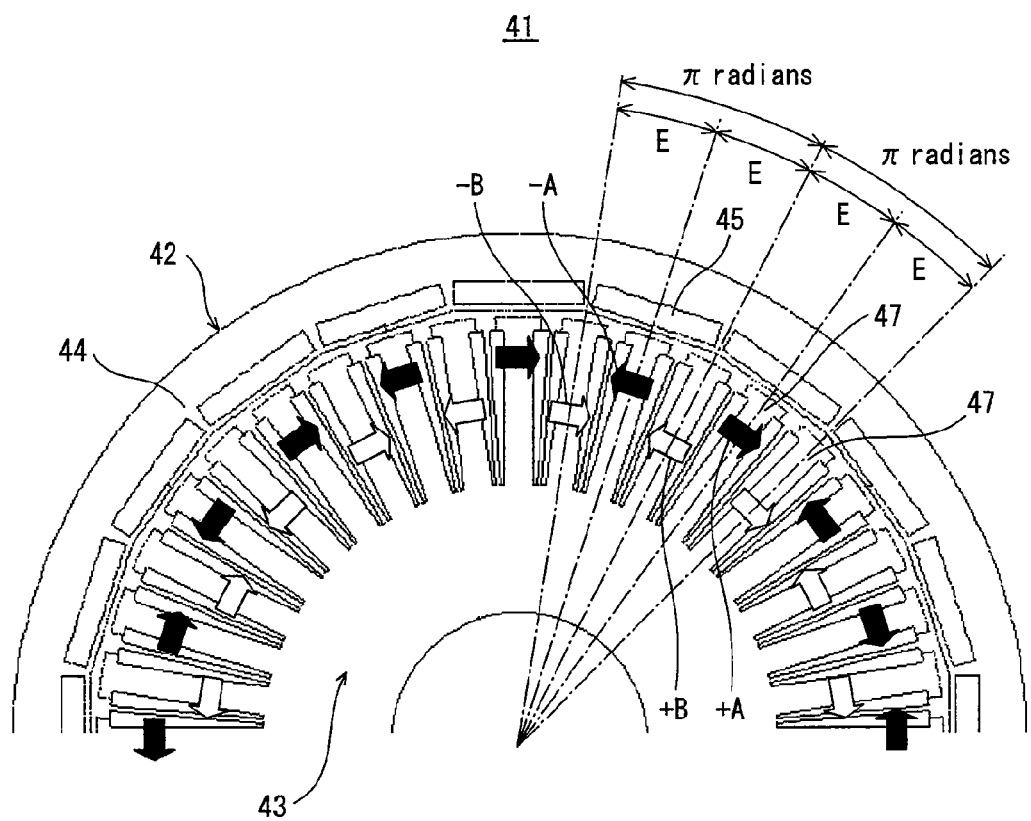
FIG. 6 is a detail view of a conventional synchronous motor.

Next, comparison is made between the torque obtained by the synchronous motor of the present embodiment and torque obtained by a conventional synchronous motor. FIG. 6 is a detail view of the conventional synchronous motor. A conventional synchronous motor 41 is what is called a two-phase motor that includes two types of coils (hereinafter, the first-type coils are referred to as an A-phase, and the second-type coils are referred to as a B-phase, respectively). The synchronous motor 41 is composed of a rotor 42 that includes permanent magnets 45, and a stator 43 that includes stator teeth 47.

Four of the stator teeth 47, as +A-phase, +B-phase, −A-phase, and −B-phase, face two magnetic poles N and S (the two poles correspond to $2\pi$ radians) of the rotor. The stator teeth 47 are arranged in the circumferential direction at equal intervals of $\pi/2$ radians in electrical angle. On each stator tooth 47, only either one of the two types of coils is wound by concentrated winding.

The number of magnetic poles in this conventional case is 20, which is the same as in the present embodiment. On the other hand, the number of the stator teeth 47 in the conventional case is 40 required for the concentrated winding. Because there are four types of coils, i.e., +A, +B, −A, and −B, for the two types of rotor magnetic poles, i.e., N and S, four torque pulsations occur per one electrical angle equivalent to one cycle of the applied current. In addition, cogging torque, which is torque pulsation occurring when no current is applied, is 40 per one rotation. This makes it difficult to achieve smooth rotation.

Figure 7:
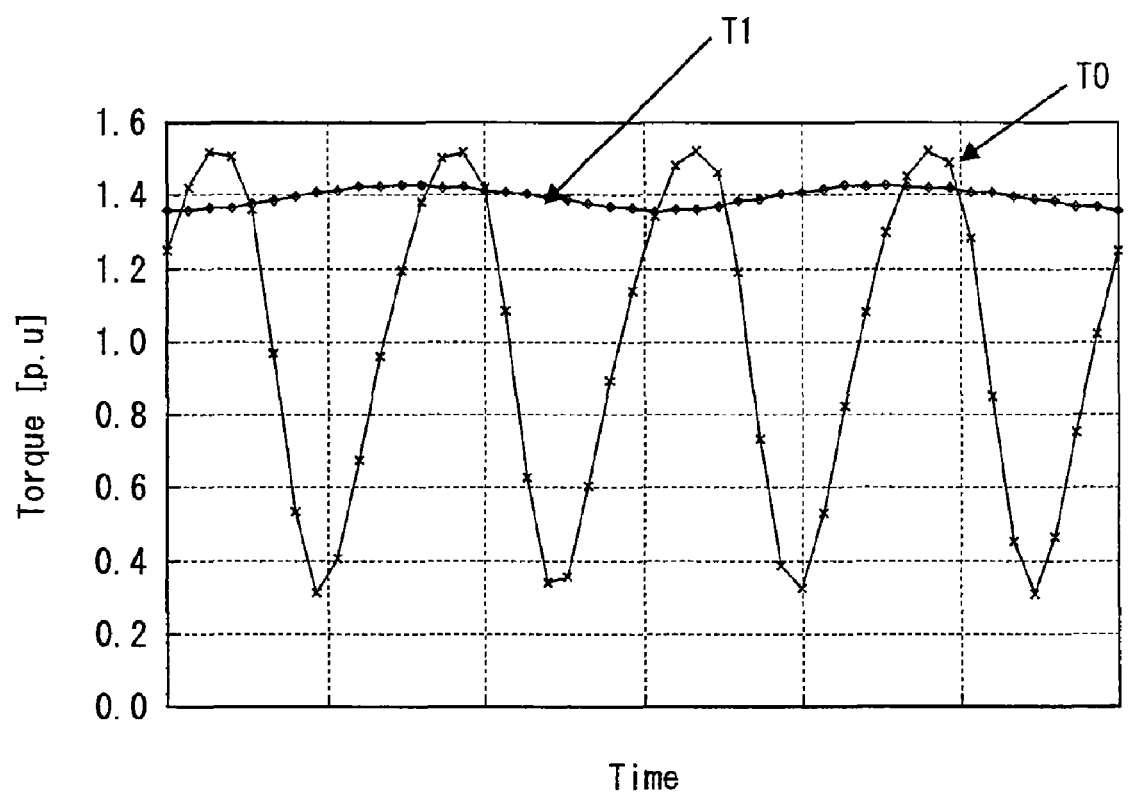
FIG. 7 shows temporal changes of torques.

FIG. 7 shows temporal changes of torques.

T1 shows a torque waveform obtained by the synchronous motor of the present embodiment, while T0 shows a torque waveform obtained by the conventional synchronous motor. These two were compared under the condition that a product obtained by multiplying the number of turns of the stator coils facing one magnetic pole pair by the applied current is the same. The result indicated that the magnitude of the torque increased by 140% compared to the conventional case. Meanwhile, a torque pulsation rate which is a ratio of the torque pulsation to the average torque was significantly reduced to 5.3% in the present embodiment, as compared to 120% in the conventional case. As described above, in the present embodiment, increase in torque and decrease in torque pulsation, which are conventionally considered to be in a trade-off relationship, are both attained.

<Supplementary Explanation>

According to the synchronous motor of the present embodiment, an interval between two adjacent poles of the rotor is 18 deg in mechanical angle ($\pi$ radians in electrical angle) while an interval between two adjacent stator teeth is 20 deg, displaced from 18 deg, in mechanical angle. With such a mechanical phase difference, the cogging torque, which is the torque pulsation occurring when no current is applied, can be reduced.

The synchronous motor of the present embodiment has the following configuration: each stator tooth is arranged to have a phase difference of $\pi/9$ radians with respect to $\pi$ radians in electrical angle; and a magnetic field generated by each stator tooth is provided with a phase difference of $\pi/9$ radians by winding two types of coils having a phase difference of $\pi/2$ radians from each other while varying the winding ratio. Consequently, the stator teeth yield the same torque. As a result, the torque pulsation having a primary cycle of $\pi/3$ radians can be cancelled, and the torque yielded by each stator tooth can be maximized, thereby increasing the overall torque.

Note that in the explanation above, the phase of a magnetic field of a stator tooth is adjusted so as to maximize the magnetic field generated when the axis of the stator tooth and the pole-to-pole gap of the rotor coincide with each other. This is because only the magnetic torque by the permanent magnets is taken into consideration. However, the synchronous motor of the present embodiment is what is called an interior permanent magnet synchronous motor that has permanent magnets arranged inside the rotor core and that is able to utilize the reluctance torque occurring due to a difference in magnetoresistance. Accordingly, in some cases, in order to maximize the torque by utilizing both the magnetic torque and the reluctance torque, it is effective to adjust the phase of a magnetic field generated by a stator tooth such that the magnitude of the magnetic field is maximized when the axis of the stator tooth and the pole-to-pole gap of the rotor do not coincide with each other.

Also, in the present embodiment, concentrated winding is adopted for winding the stator coils on the stator teeth. Consequently, the coils at the end surfaces of the stator, i.e. coil ends, can be reduced in size, thereby contributing to downsizing of the synchronous motor. Additionally, since the coil ends do not contribute to torque even during application of a current, a copper loss which is a Joule heat loss due to resistance of the coils during the application of the current can be reduced, achieving a high efficiency.

Also, the present embodiment adopts what is called an outer rotor type structure where the rotor is placed outside the outer circumference of the stator. Consequently, assuming the volumes being the same, the diameter of the rotor may be longer than an inner rotor type structure where the stator is placed inside the inner circumference of the stator. Accordingly, even for the synchronous motor of the present embodiment that has 20 poles, the size of the permanent magnets does not need to be reduced, thereby preventing a decline of the effective magnetic flux.

Furthermore, while the synchronous motor of the present embodiment has 20 rotor magnetic poles and 18 stator teeth, a synchronous motor with the following structure can achieve similar effects: the number of stator teeth being a multiple of nine such as nine or 27, and the number of magnetic poles of the rotor being a multiple of ten, thereby constituting a combination of 10q poles and 9q teeth (q being a positive integer); and these poles and teeth are arranged to satisfy the above-described relationship in electrical angle.

Additionally, in the present embodiment, the 18 stator teeth consist of groups of two stator teeth, the two stator teeth in each group being disposed at the same position in electrical angle, and two groups of nine stator teeth aligned in the circumferential direction are rotationally symmetric. Accordingly, the composite attraction in the radial direction by the stator teeth is 0, and no magnetic attraction force acts on the rotor. Consequently, no negative affect is brought on the bearing life, whereby a longer operating life of the synchronous motor can be achieved. Similarly, in a case of 30 poles and 27 teeth, three groups of nine stator teeth are arranged at angular intervals of 120 deg in mechanical angle with respect to the axis. Accordingly, the composite attraction in the radial direction by the stator teeth when a current is applied to the coils is 0, and no magnetic attraction acts on the rotor.

Also, with a structure where either the magnetic poles of the stator teeth or the magnetic poles of the rotor, or both of these are skewed in the axis direction, the magnetic flux changes more smoothly, and the vibration of the synchronous motor can be further reduced.

Additionally, with use of a dust core material, thin-sheet magnetic material, or an amorphous magnetic material as the magnetic material of the stator, iron loss can be considerably reduced, thereby achieving a synchronous motor with an even higher efficiency.

Furthermore, using a plurality of permanent magnets to constitute one magnetic pole can reduce eddy-current loss, thereby achieving a synchronous motor with an even higher efficiency.

Also, a synchronous motor with a high efficiency can be achieved by enlarging the surface area of the windings by adopting, as the windings, a plurality of thin wires, rectangular wires, or the like, so as to reduce the skin effect occurring under application of a high-frequency current.

In the present embodiment, as shown by the vector diagram in FIG. 5 that illustrates the magnitude and the phase of the magnetic field, the input currents which are the first-phase current (vector A) and the second-phase current (vector B) can generate, for the stator teeth, nine types of phases which are H1 to H9A (H10 to H18A) composited based on ratios of the numbers of turns of the coils. As a result, the synchronous motor of the present embodiment can be driven with phase differences of $2\pi/9$ radians, thereby achieving a drive that is twice or more as smooth as a normal two-phase motor driven with phase differences of $\pi/2$ radians.

As described above, in the present embodiment, the torque pulsation is reduced by improving the torque, and as a result, a compact-sized, high-output, low-vibration, low-noise, and high-efficiency synchronous motor can be provided.

Second Embodiment

The second embodiment differs from the first embodiment in angular intervals of the arrangement of the stator teeth and the structure of the windings. Other than the above, the second embodiment is similar to the first embodiment, and explanation thereof is omitted.

Figure 8:
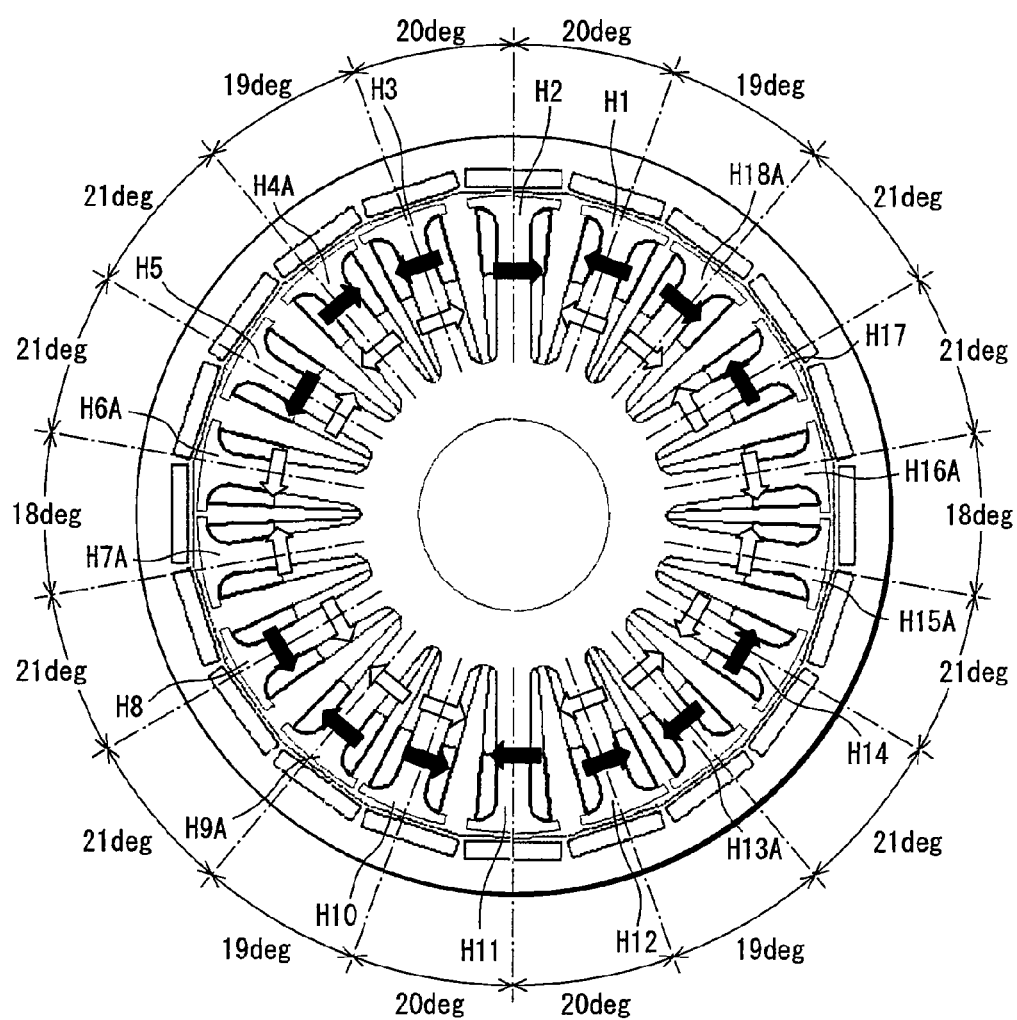
FIG. 8 is a plan view showing types and winding directions of coils in a synchronous motor pertaining to a second embodiment of the present invention.
Figure 9:
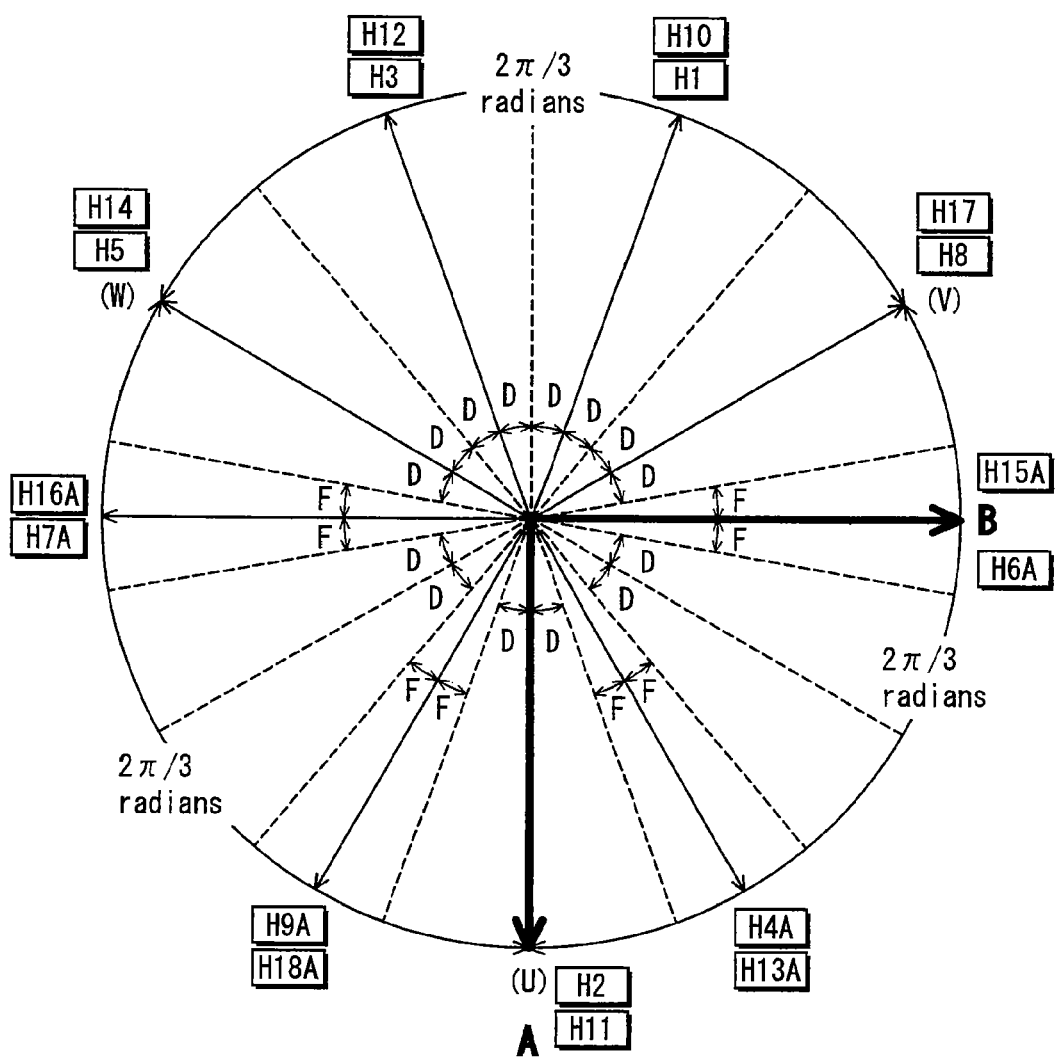
FIG. 9 is a vector diagram showing magnitudes and phases of magnetic fields generated by stator teeth of the synchronous motor of FIG. 8.

FIG. 8 is a plan view showing types and winding directions of the coils in a synchronous motor pertaining to the second embodiment of the present invention; and FIG. 9 is a vector diagram showing magnitudes and phases of magnetic fields generated by the stator teeth of the synchronous motor of FIG. 8.

The second embodiment differs from the first embodiment in the following aspects: in the synchronous motor 21, the stator teeth are not arranged at equal intervals, and the ratios of the number of the turns of the first-type and second-type coils are different. In a case where the stator teeth are not arranged with equal intervals, if the numbers of the turns of the first-type and second-type coils remain the same as those in the case where the stator teeth are arranged with equal intervals, the phases of the magnetic fields generated from these stator teeth will be displaced from the optimal phases. Accordingly, the numbers of the turns of the first-type and second-type coils are adjusted correspondingly to the displacement with respect to the equal intervals so as to set the phase of the magnetic fields generated by the stator teeth to be optimal.

<Positional Relationship of Stator Teeth and Structure of Stator Windings>

In the first embodiment, the stator teeth were arranged with equal angular intervals of 20 deg (mechanical angle). FIG. 8 shows stator teeth that are not arranged at equal intervals of 20 deg, as H4A, H9A, H13A, H18A, H6A, H7A, H15A, and H16A.

The stator teeth H4A, H9A, H13A, and H18A are arranged with an angular interval of 19 deg with the stator teeth H3, H10, H12, and H1, respectively. These stator teeth are displaced by 1 deg (10 deg, i. e. $\pi/18$ radians, in electrical angle) with respect to the first embodiment.

The stator teeth H6A, H7A, H15A, and H16A are arranged with an angular interval of 21 deg with the stator teeth H5, H8, H14, and H17, respectively. These stator teeth are displaced by 1 deg (10 deg, i.e. $\pi/18$ radians, in electrical angle) with respect to the first embodiment. Accordingly, H6A and H7A are arranged with an angular interval of $\pi$ radians in electrical angle therebetween, and H15A and H16A are also arranged with an angular interval of $\pi$ radians in electrical angle.

In the present embodiment, the stator teeth are displaced from the positions where the stator teeth are assumed to be disposed when arranged at equal intervals, by a range of $\pm\pi/9$ radians. The positions of the stator teeth with reference to the stator tooth H2 are shown in Table 3.

| H1 | H2 | H3 | H4A | H5 | H6A | H7A | H8 | H9A |
|---|---|---|---|---|---|---|---|---|
| $\frac{16}{18}\pi$ | 0 | $\frac{20}{18}\pi$ | $\frac{3}{18}\pi$ | $\frac{24}{18}\pi$ | $\frac{9}{18}\pi$ | $\frac{27}{18}\pi$ | $\frac{12}{18}\pi$ | $\frac{33}{18}\pi$ |

| H10 | H11 | H12 | H13A | H14 | H15A | H16A | H17 | H18A |
|---|---|---|---|---|---|---|---|---|
| $\frac{16}{18}\pi$ | 0 | $\frac{20}{18}\pi$ | $\frac{3}{18}\pi$ | $\frac{24}{18}\pi$ | $\frac{9}{18}\pi$ | $\frac{27}{18}\pi$ | $\frac{12}{18}\pi$ | $\frac{33}{18}\pi$ |

As shown in Table 3, although 18 stator teeth are arranged with unequal angular intervals, there are two stator teeth located at each same position in terms of electrical angle, and each group of nine stator teeth aligned in the circumferential direction is rotationally symmetric.

Described next is the structure of the stator windings.

On each stator tooth, both or one of first-type and second-type coils is wound in a manner called concentrated winding. In FIG. 8, black arrows schematically show the directions of flow of a current fed to the first-type coils. Similarly, white arrows schematically show the directions of flow of a current fed to the second-type coils.

Table 4 below shows ratios of the number of turns of the first-type and second-type coils wound on the stator teeth.

TABLE 4

| | H1 H10 | H2 H11 | H3 H12 | H4A H13A | H5 H14 | H6A H15A | H7A H16A | H8 H17 | H9A H18A |
|---|---|---|---|---|---|---|---|---|---|
| A | −0.94 | 1.00 | −0.94 | 0.87 | −0.50 | 0.00 | 0.00 | −0.50 | 0.87 |
| B | 0.34 | 0.00 | −0.34 | 0.50 | −0.87 | 1.00 | −1.00 | 0.87 | −0.50 |
| Σ | 1.28 | 1.00 | 1.28 | 1.37 | 1.37 | 1.00 | 1.00 | 1.37 | 1.37 |

In the second embodiment, H4A (H13A), H6A (H15A), H7A (H16A), and H9A (H18A) are not arranged at equal angular intervals, and the ratios of the numbers of the turns are adjusted correspondingly. Note that the numbers of the turns of the first-type and second-type coils are determined from the following expressions, as in the first embodiment.

$$A_n \approx N_0 \times \cos(\theta n)$$

$$B_n \approx N_0 \times \sin(\theta n)$$

For example, only a second-type coil 29b is wound on H6A (H15A) and H7A (H16A), and the ratio of the total number of turns of these stator teeth is 1. This allows reduction in the number of turns compared to the ratio 1.16 of the total number of turns of H6 (H15) and H7 (H16) in the first embodiment.

The stator teeth H4A (H13A) and H9A (H18A) are displaced only by π/18 radians (10 deg) in electrical angle with respect to when arranged with equal intervals. As a result, the ratio of the number of turns of the first-type coil is 0.87, the ratio of the number of turns of the second-type coil is 0.50, and the ratio of the total number of turns is 1.37. This allows reduction in the number of turns compared to the ratio 1.41 of the total number of turns of H4 (H13) and H9 (H18) in the first embodiment.

As described above, the present embodiment achieves a smaller ratio of the total number of turns, which leads to an increase in the winding space factor ratio, thereby achieving an effect equivalent to that of the first embodiment, and also is advantageous for further reduction in size.

Additionally, in the present embodiment, the number of stator teeth that have only one of the first-type and second-type coils wound thereon can be increased. This leads to reduction in manufacture cost.

In the present embodiment, as shown by the vector diagram in FIG. 9 that illustrates the magnitudes and phases of the magnetic fields, the input currents which are the first-phase current (vector A) and the second-phase current (vector B) can generate, for the stator teeth, nine types of phases which are H1 to H9A (H10 to H18A) composited based on ratios of the numbers of turns of the coils. As a result, the synchronous motor of the present embodiment can be driven with phase differences of π/6 radians, 2π/9 radians, and π/3 radians, thereby achieving a drive that is 1.5 to 2 times as smooth as a normal two-phase motor driven with phase differences of π/2 radians.

The present embodiment is also characterized in that slight changes in the arrangement of the stator teeth and in the winding ratios are able to change equal intervals into nine kinds of phase differences. This structure suggests realization of arbitrary combinations of phase differences, and accordingly, resonance which occurs due to the device equipped with the motor and which is difficult to avoid can be easily avoided.

With the above-described structure, the torque pulsation can be reduced by shifting the intervals of the arrangement of the stator teeth in electrical angle, from the positions corresponding to integral multiples of the phase difference between the two-phase alternating currents. In other words, the order of cogging torques occurring when no current is applied can be set high, and as a result, the value of the cogging torques can be reduced.

Furthermore, on the stator teeth shifted from the positions corresponding to the multiples of the phase difference of the two-phase alternating currents, both the first-type and second-type coils are wound in a manner that the winding ratio thereof compensates for the shift. This way, when a current is applied, a large torque can be generated by the stator teeth, and accordingly, the torque pulsation can be reduced without reducing the magnitude of the torque.

Up to now, the present invention has been described based on the embodiments. However, the present invention is not limited to the above embodiments, and, for example, the following modifications can be implemented.

(1) In the embodiments above, one stator tooth is a reference stator tooth, and all or a majority of the remaining stator teeth are displaced from the positions corresponding to integral multiples of the phase difference (π/2 radians) in electrical angle from the reference stator tooth. However, the present invention is not limited to this structure, and smaller torque pulsation compared to the conventional cases can be achieved by displacing at least one of the remaining stator teeth.

(2) In the embodiments above, the phase difference of the two-phase alternating current is π/2 radians. However, the present invention is not limited to this structure. When the phase difference of the two-phase alternating current is arbitrary φ radians, the numbers of turns of the first-type and second-type coils wound on each stator tooth can be determined from the following expressions.

$$A_n = N_0 \times \{\cos(\theta n) - \sin(\theta n)/\tan(\phi)\}$$

$$B_n = N_0 \times \{\sin(\theta n)/\sin(\phi)\}$$

Figure 10A:
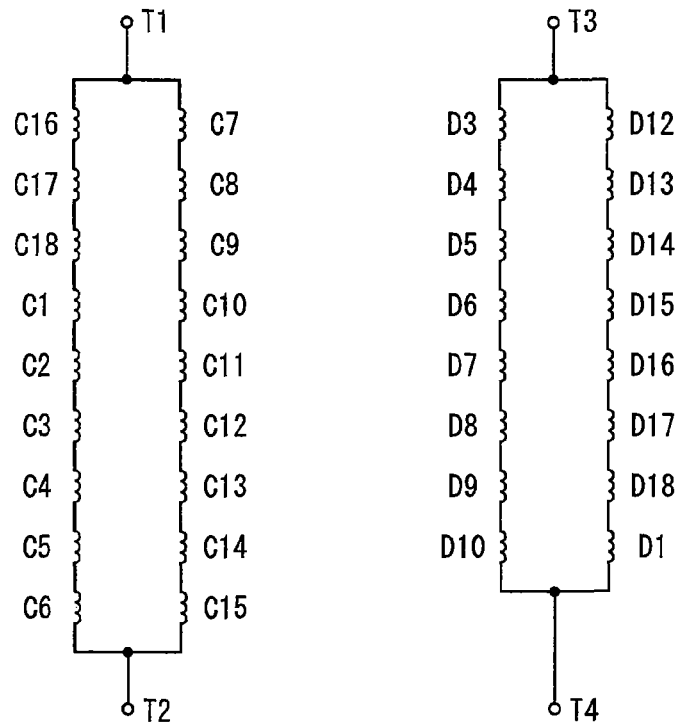
FIGS. 10A 10B show modified connection relationships of the coils.
Figure 10B:
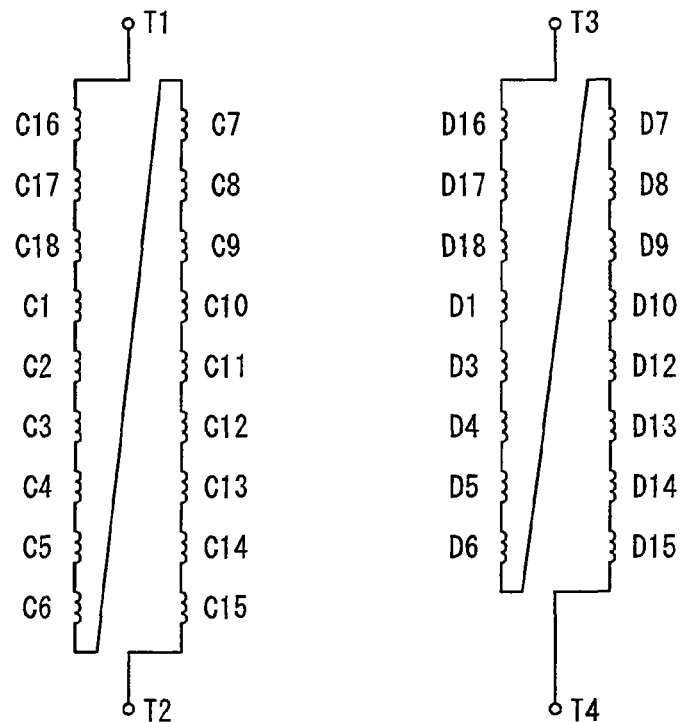

(3) In the embodiments above, as shown in FIG. 4, first-type coils are connected in series for each group of stator teeth, and second-type coils are connected in series for each group of stator teeth. In other words, the first-type coils and the second-type coils are respectively connected in series for the same groups of the stator teeth. According to the present invention, however, the groups of stator teeth for which the first-type coils are connected in series and the groups of stator teeth for which the second-type coils are connected in series do not need to be the same so long as the coils for a group of k (k=9 in the present embodiments) stator teeth aligned in the circumferential direction are connected in series. FIG. 10A shows one such example. In FIG. 10A, the first-type coils are connected in series separately for two groups of nine stator teeth H16 to H6 and H7 to H15 respectively aligned in the circumferential direction. On the other hand, the second-type coils are connected in series separately for two groups of nine stator teeth H2 to H10 and H11 to H1 respectively aligned in the circumferential direction.

(4) In the embodiments above, as shown in FIG. 4, the group of the first-type coils C16 to C6 and the group of the first-type coils C7 to C15 are connected in parallel, and the group of the second-type coils D16 to D6 and the group of the second-type coils D7 to D15 are connected in parallel. However, the present invention is not limited to this structure. Alternatively, for example, as shown in FIG. 10E, a structure in which the group of the first-type coils C16 to C6 and the group of the first-type coils C7 to C15 are connected in series and the group of the second-type coils D16 to D6 and the group of the second-type coils D7 to C15 are connected in series may be adopted.

(5) In the embodiments above, as an example, the number of stator teeth is 18, and the number of magnetic poles is 20. However, not limited to this, the present invention is applicable as long as the number stator teeth is four or more and the number of magnetic poles is an even number other than the number of the stator teeth.

(6) In the embodiments above, the structure with the combination of 10q poles and 9q teeth is described. However, the present invention is not limited to this combination. For example, the structure with a combination of 8q poles and 9q teeth, 10q poles and 12q teeth (q being a positive integer), or 16q poles and 15q teeth may be adopted alternatively.

(7) The embodiments above exemplify a two-phase driven synchronous motor that is equivalent to a three-phase driven synchronous motor. However, the present invention is applicable to a two-phase driven synchronous motor that is equivalent to a multi-phase driven motor such as a five-phase or seven-phase driven synchronous motor.

(8) In the embodiments above, the stator coils are wound on the stator teeth. However, the present invention is not limited to this structure, and is applicable to what is called a coreless motor which has no stator tooth, instead.

(9) Although no specific description is given in the embodiments above, a skew arrangement in which the stator windings are skewed with respect to the axis direction of the rotor by an interval of two stator windings at maximum may be applied.

(10) The embodiments above exemplify an outer rotor type synchronous motor in which the rotor is disposed outside the stator. However, the same effect can be achieved by an inner rotor type synchronous motor in which the rotor is disposed inside the stator, a so-called axial gap type synchronous motor in which the rotor and the stator are disposed with a space in between in the axial direction, and a synchronous motor with a combination of these structures.

(11) In the embodiments above, the magnetic poles of the stator are composed of permanent magnets. However, the present invention is applicable to synchronous motors using reluctance torque generated from a difference in magnetoresistance or synchronous motors which include a combination of permanent magnets and reluctance torque.

(12) The present invention is not only applicable to synchronous motors, but also applicable to synchronous electric generators as well as to direct driven linear synchronous motors and linear synchronous electric generators.

(13) The present invention is able to provide a synchronous motor with characteristics such as compact size, high output, low vibration, low noise, and high efficiency, and accordingly, is particularly useful for automobiles which require low vibration and low noise.

INDUSTRIAL APPLICABILITY

The present invention is applicable to synchronous motors for compressors, electrical vehicles, hybrid vehicles, fuel-cell vehicles, and the like, as these synchronous motors require compact size, high efficiency, low vibration, and low noise.

REFERENCE SIGNS LIST 1, 21, 41 synchronous motor
2, 42 rotor
3, 43 stator
4 rotor core
5, 45 permanent magnet
6 magnetic pole
7, 47 stator tooth
8 stator yoke
9 coil
10, 11 pole-to-pole gap

The invention claimed is:

1. A synchronous motor driven by a two-phase alternating current composed of a first-phase alternating current and a second-phase alternating current which have a phase difference with respect to each other, the synchronous motor comprising:
a rotor that includes a plurality of magnetic poles arranged at equal intervals in a circumferential direction; and
a stator that includes an annular yoke and N teeth arranged at intervals on the yoke in the circumferential direction, N being an integer of four or greater, wherein
the stator is configured such that the N teeth (i) include sets of n teeth, n teeth in each set being disposed at a same position in terms of electrical angle, and (ii) are grouped into first groups of k teeth, k teeth in each first group being aligned in the circumferential direction, each first group being rotationally symmetric about an axis of the yoke, n and k each being an integer of two or greater, and N=k·n,
one of the k teeth in each first group is a reference tooth, and at least another one of the k teeth in the first group is a displaced tooth which is displaced from a position corresponding to an integral multiple of the phase difference with respect to the reference tooth in electrical angle,
only either one of first-type coils or one of second-type coils is wound on the reference tooth by concentrated winding, the first-type coils being supplied with the first-phase alternating current, and the second-type coils being supplied with the second-phase alternating current,
both one of the first-type coils and one of the second-type coils are each wound on the displaced tooth by concentrated winding,
first-type coils wound on the teeth in each first group are connected in series, and
second-type coils wound on k teeth, aligned in the circumferential direction, in each of second groups are connected in series, the second groups being either same or different with respect to the first groups.

2. The synchronous motor of claim 1, wherein
the first-type and second-type coils are wound on the N teeth such that two magnetic fields respectively generated by any two adjacent teeth are opposite to each other in direction.

3. The synchronous motor of claim 1, wherein
a number of turns $A_n$ of the first-type coil and a number of turns $B_n$ of the second-type coil wound on the displaced tooth are determined based on following equations, $$A_n = N_0 \times \{\cos(\theta n) - \sin(\theta n)/\tan(\phi)\}$$

$$B_n = N_0 \times \{\sin(\theta n)/\sin(\phi)\}$$

where the phase difference is $\phi$ radians,
a position of the displaced tooth with respect to the position of the reference tooth is $\theta n$ radians in electrical angle,
only the first-type coil is wound on the reference tooth, a number of turns of the first-type coil being $N_0$, and
each value of $A_n$ and $B_n$ being positive or negative indicates a direction of a magnetic field generated when a current is applied.

4. The synchronous motor of claim 1, wherein
a number of turns $A_n$ of the first-type coil and a number of turns $B_n$ of the second-type coil wound on the displaced tooth are determined based on following equations, $$A_n = N_0 \times \cos(\theta n)$$

$$B_n = N_0 \times \sin(\theta n)$$

where the phase difference is $\pi/2$ radians,
a position of the displaced tooth with respect to the position of the reference tooth is $\theta n$ radians in electrical angle,
only the first-type coil is wound on the reference tooth, a number of turns of the first-type coil being $N_0$, and
each value of $A_n$ and $B_n$ being positive or negative indicates a direction of a magnetic field generated when a current is applied.

5. The synchronous motor of claim 1, wherein
the N teeth are arranged at equal intervals, and all of the k teeth in each first group other than the reference tooth are displaced from positions corresponding to integral multiples of the phase difference with respect to the reference tooth in electrical angle.

6. The synchronous motor of claim 5, wherein
each first group is composed of nine teeth including the reference tooth at a center position there among.

7. The synchronous motor of claim 1, wherein
the N teeth are arranged at unequal intervals, and among the k teeth in each first group other than the reference tooth, one or more teeth are displaced from positions corresponding to integral multiples of the phase difference with respect to the reference tooth in electrical angle, and remaining one or more teeth are placed at the positions corresponding to the integral multiples of the phase difference with respect to the reference tooth in electrical angle, and
on each of the teeth corresponding to the integral multiples, only either one of the first-type coils or one of the second-type coils is wound by concentrated winding.

8. The synchronous motor of claim 7, wherein
each first group is composed of nine teeth including the reference tooth at a center position there among, wherein only the first-type coil is wound on the reference tooth, and among the nine teeth in each first group, positions of teeth at both ends correspond to the integral multiples and each have only the second-type coil wound thereon.

9. The synchronous motor of claim 1, wherein
a number of the magnetic poles is an even number other than N.

10. The synchronous motor of claim 9, wherein
the number of the magnetic poles is 10 or more.

11. The synchronous motor of claim 1 being a coreless synchronous motor from which the teeth are eliminated while a positional relationship of the coils is maintained.

12. The synchronous motor of claim 1, wherein
at least one of the N teeth is disposed with skew arrangement with respect to an axial direction of the stator so as to be displaced in the circumferential direction by an interval between two teeth at a maximum.

13. The synchronous motor of claim 1 being an inner-rotor type synchronous motor.

14. The synchronous motor of claim 1 being an interior permanent magnet synchronous motor.

15. The synchronous motor of claim 1 being for use in an automobile.

* * * * *